United States Patent Office 3,730,900
Patented May 1, 1973

3,730,900
COMPOSITION AND PROCESS FOR DRILLING SUBTERRANEAN WELLS
Alphonse C. Perricone and Homer F. Young, Houston, Tex., assignors to Milchem Incorporated, Houston, Tex.
No Drawing. Continuation-in-part of application Ser. No. 126,907, Mar. 22, 1971. This application Sept. 25, 1972, Ser. No. 291,778
Int. Cl. C10m 3/34
U.S. Cl. 252—8.5 C             4 Claims

ABSTRACT OF THE DISCLOSURE

A composition, additive, and process for the drilling of subterranean wells utilizing a low molecular weight styrene sulfonic acid-maleic anhydride copolymer as a colloidal stabilizer for aqueous drilling fluids. The composition, additive, and process are particularly effective when drilling under extremely high temperature and pressure environments.

CROSS-REFERENCE TO RELATED APPLICATION

This application is a continuation-in-part of our copending application Ser. No. 126,907, filed Mar. 22, 1971, now abandoned.

BACKGROUND OF THE INVENTION

(1) Field of the invention

The present invention relates to the use of low molecular weight copolymers of styrene sulfonic acid and maleic anhydride and water soluble salts thereof, as additives for aqueous drilling fluids used in the drilling of subterranean wells. A process for drilling a subterranean well with said copolymer is also taught.

(2) Description of the prior art

When drilling subterranean wells in order to tap deposits of, for example, oil or gas, and in particular when utilizing a rotary drilling method comprising a bit to which is attached a drill stem, a drilling fluid is circulated to the bottom of the borehole, ejected through small openings in the drill bit at the bottom of the hole, and then returned to the surface through the annular space between the drill stem and the wall of the borehole where it may be mechanically and/or chemically treated and recirculated. When casing has been inserted into the hole, the fluid will circulate between the drill stem and the internal wall of the casing. Reverse circulation, in which the drilling fluid is injected into the hole through the annular space and returned to the surface by means of the drill stem, is sometimes utilized.

Drilling fluids serve multi-functions and must have a variety of properties. For example, a drilling fluid for utilization as discussed above must be a liquid of such viscosity that it may serve as an effective transporter of cuttings from the borehole to the surface for removal. A drilling fluid must also prevent excessive amounts of fluid from flowing from the borehole into surrounding formations by depositing on the wall of the hole a thin but substantially impervious filter cake. In addition, a drilling fluid must also be able to hold solids in suspension, preventing their return into the bit area when the circulating rate is reduced or the drilling temporarily terminated. This property is obtained by utilizing additives which will give to the drilling fluid a gel structure. A drilling fluid must also provide a high density column, exerting pressure on the surrounding formations, thus preventing possible caving of the borehole by highly pressurized oil or gas in the formation. Finally, a drilling fluid must also serve as a lubricating agent for the bearings utilized in the drill bit and on the surface of the bit teeth.

Drilling fluids are of three basic types: (1) a mud-laden fluid having an aqueous base; (2) a mud-laden fluid with a hydrocarbon, or oil, base; and (3) air or gas. Combinations of these are also used.

Aqueous, or water base drilling fluids contain water as the foundation, colloidal solids, and usually a chemical dispersant or "thinner." The water in these systems may be in the form of fresh water, salt water, or a brine. In the past, those skilled in the drilling art have relied heavily on the use of bentonite as the added colloidal material. This material is added to the aqueous base primarily to give to the system a thixotropic or gel structure. An ideal aqueous drilling fluid is a thixotropic colloidal system which on agitation initiated by pumping has a measurable, relatively low viscosity and is free flowing rather than plastic, especially at high temperatures. When the circulation of the system is reduced or terminated the fluid sets or gels. The rate of gel formation is sufficient to permit the cuttings to fall only a short distance before the gel structure is strong enough to support them.

One of the principal problems in producing effective and consistent aqueous drilling fluids is the production of a system having satisfactory dispersibility and the necessary thixotropic properties discussed above. However, as the drilling proceeds through different strata, the viscosity and gel strength attributed to the colloidal material, i.e., bentonite, may be affected by the character of the drilled strata, by loss or absorption of water in the porous strata or in the inflow of water and other fluids, by chemically active substances which may enter the drilling fluid as the drilling proceeds, and particularly by temperature and pressure increases as hole depth increases. As these activities affect viscosity and increase gels, colloidal stabilizing materials are added to the system from time to time.

Treatment of aqueous drilling fluids with phosphate-containing materials results in deflocculating colloidal clay and drilled solids permitting higher mud density, lower viscosity and gels, reduced filter loss, and thinner filter cakes. Tannins are sometimes added with phosphates and polyphosphates to aid in the deflocculation or "thinning" phenomena. However, these polyphosphate materials are generally unstable at high temperatures encountered in many deep holes and, as a result, lose their effectiveness as colloidal stabilizers.

Lignite, a readily available raw material, has been used in aqueous drilling fluids to control thixotropy. Its usefulness as a thinner has been limited because it is rendered much less effective by commonly encountered mud contaminants such as sodium chloride and calcium materials such as gypsum and the like. These contaminants will progressively precipitate the lignite so that it can no longer exert its desired protective colloidal action. Though less susceptible to temperature degradation than polyphosphates, lignites have been proven to also be less effective as increased temperatures and pressures are encountered.

Lignin macromolecules, especially in the form of lignosulfonates, have ben particularly useful in the thinning of clay based aqueous systems. Although calcium lignosulfonate has been utilized in lime-treated muds, sodium lignosulfonates and lignosulfonates having present chromium have become particularly useful. These materials have been found to be useful in fluids to which calcium sulfate has been added. These materials have been found not only to provide viscosity reduction but also to prevent excessive loss of fluid into porous formations. Their utilization has been extended to a variety of fluids designed to limit hydration of clay and shale.

Increasing temperatures and pressures resulting from deeper penetration drastically increase the flow resistance of the drilling fluid. As a result of temperature degradation of the drilling fluid, a considerable increase in pump pressure is required to move the fluid through the drill pipe. The energy deliverable to the bit is drastically reduced. As the temperature soars, sometimes into the 500° F. range and higher, chemical reactions will affect filtration, viscosity, and shear strength of mud systems. Phosphates begin to lose their effectiveness as stabilizers at around 130° F. to 150° F. Starches and CMC begin to lose their effectiveness as viscosity and filtration control additives from between 200° F. and 260° F. while the lignosulfonates may begin to degrade at 375° F. to 425° F.

The unsatisfactory performance of conventional water base fluids at elevated temperatures may be attributed to several factors, one of which is thermal degradation of additives. Some additives in themselves may be detrimental to drilling fluid properties and eventually result in high-temperature solidification. Additives are consumed and must be replaced as drilling continues. Consumption of drilling fluid additives is first evidenced by a significant increase in maintenance requirements. As the bottom-hole temperature increases these requirements may approach total replacement of all unstable additives for each circulation of the drilling fluid through the hole.

Other serious difficulties may arise as a result of drilling fluid exposure of high temperatures and pressures. For example, high temperature solidification or excessive gel strengths attributed thereto can be responsible for pressure surges, swabbing, and the like. These conditions are conducive to loss of circulation. In addition, logging tools may be prevented from reaching bottom because of the excessive gel strengths. These difficulties and the need for extensive mud conditioning after trips can add up to an appreciable amount of lost rig time.

Styrene-maleic anhydride copolymers have been useful in a variety of industrial applications. However, the use of this material has several disadvantages. For instance, it is known that these materials have a tendency to lose effectiveness when utilized in brines or waters having a high electrolyte activity. In addition, these materials become less effective at elevated temperatures. We have discovered that when styrene is copolymerized with maleic anhydride and then sulfonated, thereby producing styrene sulfonic acid, an improved colloidal stabilizer and thermal degradation preventative is produced that has particular application in the drilling of subterranean water, gas and oil wells. The addition of $SO_3$ groups into the styrene structure permits the material to become highly compatible and soluble in a host of aqueous environments which would otherwise render the copolymer less effective. The use of a low molecular weight styrene sulfonic acid-maleic anhydride copolymer and particularly a water soluble salt thereof will enhance and extend the "life" of aqueous drilling fluids and additives incorporated therein. The use of our additive, composition and process will remedy many of the problems attributed to thermal and pressure decomposition as discussed above.

It is, therefore, an object of the present invention to provide a drilling fluid additive.

It is a further object of the present invention to provide a drilling fluid composition particularly useful in high temperature, high pressure environments.

It is also an object of the present invention to provide a process for the substantial reduction of thermal degradation of aqueous drilling fluids and additives utilized therein.

It is also an object of the present invention to provide a method of drilling a subterranean well.

Other objects and advantages of the use of the present additive, composition, and process will be apparent from a reading of the disclosure, examples, and claims which follow.

SUMMARY OF THE INVENTION

The present invention relates to the use of low molecular weight copolymers of styrene sulfonic acid and maleic anhydride and water soluble salts thereof, as additives for aqueous drilling fluids used in the drilling of subterranean wells. A process for drilling a subterranean well with said copolymer is also taught.

DESCRIPTION OF THE PREFERRED EMBODIMENTS

Styrene has been prepared utilizing a number of methods. It can, for instance, be prepared from benzene and ethylene. This reaction is as follows:

(1)
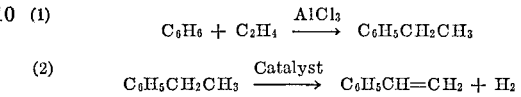

(2) $C_6H_5CH_2CH_3 \xrightarrow{Catalyst} C_6H_5CH=CH_2 + H_2$

Styrene can also be prepared from benzene and ethylene using acetophenone. The reaction is as follows:

(1) $C_6H_6 + \quad + C_2H_4 \xrightarrow{AlCl_3} C_6H_5CH_2CH_3$ (2) $C_6H_5CH_2CH_3 + O_2 \xrightarrow{Mn\ Acetate} C_6H_5COCH_3 + H_2O$ (3) $C_6H_5COCH_3 + H_2 \xrightarrow{Catalyst} C_6H_5CHOHCH_3$ (4) $C_6H_5CHOHCH_3 \xrightarrow{TiO_2} C_6H_5-CH=CH_2 + H_2O$ Maleic anhydride can be prepared from either butylenes or benzene by catalytic vaporphase oxidation. In the case of benzene, the reaction would be as follows:

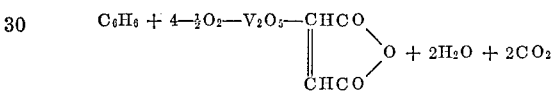

In order to prepare the drilling fluid additive and composition of the present invention, styrene is copolymerized under controlled conditions with maleic anhydride. The resulting product is then sulfonated, separated from the solution, and dried.

Processes of polymerizing styrene and maleic anhydride have been taught in the prior art and our invention is not necessarily dependent upon any particular polymerization process or technique. It is, however, important that a relatively low molecular weight copolymer be produced. We have found that the lower the molecular weight, the more effective the material will be in providing colloidal stabilization at the higher temperatures. Conversely, the higher the molecular weight, the less effective will be the resulting product. For the purposes of better defining our product, we define "low molecular weight" to be a styrene-maleic anhydride copolymer or a water soluble salt thereof before sulfonation, having a molecular weight of between about 1,000 and about 5,000. It is believed that the styrene sulfonic acid-maleic anhydride copolymer will have the following general structure.

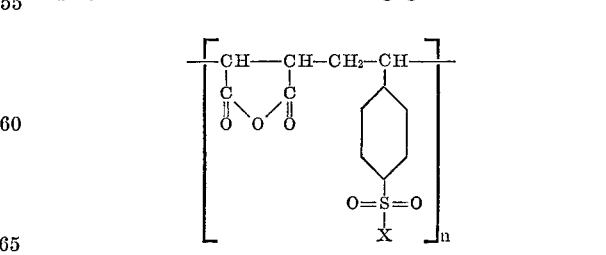

wherein X is oxygen and hydrogen or oxygen and a metal, producing a water soluble salt, and $n$ is the degree of polymerization which should not exceed a molecular weight of about 5,000 before sulfonation.

Any polymerization technique known to those skilled in the art and which will produce the copolymer within the above defined molecular weight range can be employed. Varying ratios of styrene and maleic anhydride can be employed. The exact ratio will vary depending on factors such as the particular polymerization process, the sulfonation step, and the particular drilling environment. However, because maleic anhydride is difficult to polymerize when not in the presence of another polymerizable monomer, it is important that the molar ratio of styrene-to-maleic anhydride be no less than about 1-to-1, which is also our preferred ratio.

The styrene and maleic anhydride monomers are polymerized in solution. Any organic liquid may be used as the polymerization solvent which is inert under the reaction conditions and is soluble with the reactants. For example, ketones and esters such as acetone, dioxane, methyl isobutyl ketone, methyl ethyl ketone, mesityl oxide, ethyl acetate, and butyl acetate may be used. Toluene and carbon tetrachloride may also be utilized. We presently prefer to utilize dichloroethane as a solvent. The reactants polymerize quite satisfactorily at a concentration of between about 10% to about 40% in the solvent although it should be apparent that the success of the particular reaction is not dependent on any particular range of concentration and that the concentration will be dictated by particular requirements.

The reaction will usually require a catalytic ion in order to properly initiate the reaction. Any effective peroxidic catalyst known to those skilled in the art may be utilized. Examples of some of these compounds are benzoyl peroxide, acetone peroxide, lauryl peroxide, succinyl peroxide, tert-butyl hydroperoxide, di-tert-butyl peroxide, tert butyl perbenzoate and the like. We presently prefer to use benzoyl peroxide in an amount of about 5% of the styrene and maleic anhydride reactants. However, more or less catalyst may be used depending upon the reaction conditions and upon the amount of heat which is applied to the reactant solution.

In order to provide a material of sufficient low molecular weight, a chain transfer agent must be utilized to prevent the reaction from continuing once the desired viscosity and molecular weight are obtained. This can be accomplished by utilizing a mercaptan. Mercaptans which may be employed in the preparation of the copolymer for use in the present invention include tert-amyl mercaptan, n-hexyl mercaptan, isooctyl mercaptan, lauryl mercaptans, octadecyl mercaptans and the like. We utilize thioglycolic acid as a preferred mercaptan chain transfer agent. The effect of the mercaptan is proportional to the amount of sulfur which is contained in the mercaptan. The molecular weight of the copolymer which is obtained from the reaction is usually inversely proportional to the amount of sulfur present in the form of mercaptan. The most efficient mercaptans have thus been found to be those having lower molecular weights.

As briefly discussed earlier, it is the sulfonation of the para position of the aromatic ring of the styrene molecule of the copolymer which permits the additive, composition, and process of the present invention to possess unique qualities. Sulfonation may be obtained by a variety of methods known to those skilled in the art. The $SO_3$ group should attach itself at the para position on the aromatic ring. It is possible that under some circumstances the $SO_3$ will be attached at the ortho position of the molecule. In addition, when using some sulfonation techniques, the $SO_3$ group may appear at both positions. The resulting product is polystyrene sulfonic acid which may later be converted to a water soluble salt.

The copolymer may be sulfonated by utilizing a variety of methods. For example, chlorosulfonic acid, concentrated sulfuric acid or other sulfur materials capable of making $SO_3$ available for sulfonation may be used. Sulfur trioxide itself may also be utilized. In order to prevent a cross-linking of the benzene ring resulting in an increase in both the viscosity and molecular weight of the copolymer, a complexing agent such as triethylphosphate should be utilized. If a complexing agent is not incorporated into the reaction, the reaction should be conducted in an ice bath to prevent the reaction from taking place at increased temperatures. Alternatively, complexing agent may be omitted if a sulfonation additive is employed which has been stabilized against polymerization in known ways with an inhibitor and placed in storage.

A usual method of obtaining sulfonation is to dissolve the copolymer in a liquid chlorinated aliphatic hydrocarbon such as ethylene chloride, ethylene dichloride, dichloroethane, carbon tetrachloride, or the like, to form a solution of the copolymer and treat the resulting solution with a sulfonating agent such as sulfur trioxide or the like while maintaining the solution at a temperature of below about 25° C. The reaction is preferably conducted under a blanket of nitrogen.

The molecular weight of styrene maleic-anhydride copolymer or water soluble salt thereof before sulfonation should be between about 1,000 and about 5,000. As molecular weight is increased, water solubility will decrease and the copolymer will lose its colloidal stabilization characteristics. In fact, if a material is utilized having an increased molecular weight, flocculation of colloidal particles is likely to occur, contributing to undesirable increased gels at high temperatures and pressures, and may actually contribute to thermal degradation and colloid instability.

Our invention also incorporates a process providing colloidal stabilization of aqueous drilling fluids and additives thereof preferably utilizing the sodium salt of a styrene sulfonic acid-maleic anhydride copolymer discussed above and detailed in Example I. The amount of copolymer utilized will vary with the particular drilling environment at hand. Formation characteristics, borehole properties, drilling depth, contaminants, temperatures and pressures encountered and drilling fluid weight will influence the determination of quantities of copolymer to be utilized in order to achieve the desired effect. In addition, the particular properties of the copolymer produced will also influence the determination of quantities needed in the process. Because of this it is impossible to specifically state nominal usage levels under all environments or conditions. Those skilled in the art of drilling will be able to easily determine needed ratios by testing samples obtained from the borehole, checking formation characteristics, temperatures and by otherwise determining the rheological properties that will be required.

Nevertheless, it can be stated that, under most high temperature drilling conditions, about 2 p.p.b. (pounds per 42-gallon barrel) treatment should be sufficient. It is possible under some circumstances to utilize concentrations as low as about 0.5 p.p.b. or as high as about 25 p.p.b. The copolymer may be added to the drilling fluid as a pretreatment or may be added in predetermined quantities to the drilling fluid and thereafter the fluid is circulated in the well bore. The copolymer is readily adaptable to all drilling environment, being effective in fresh water, salt solution, and in brines. A variety of drilling fluid additives may be utilized in the drilling fluid treated with the styrene sulfonic acid-maleic anhydride copolymer. For example, lignosulfonates, starch, bentonite, barite, lignite, quebracho, carboxymethylcellulose, and other commonly utilized additives may form the drilling fluid to which is additionally added the present copolymer.

The following examples will further illustrate the novel qualities of the additive, composition, and process of the present invention.

EXAMPLE I

The present example demonstrates a process which may be utilized to obtain the sodium salt of a styrene sulfonic acid-maleic anhydride copolymer for use in accordance with our invention. Twenty-three and one-half (23.5) grams of maleic anhydride were dissolved with 16.5 grams of styrene in 400 grams of toluene in a one liter flask equipped with a nitrogen inlet, thermometer, stirrer, and condenser. A nitrogen blanket is applied to the flask contents. Three grams of benzoyl peroxide is then added to the flask followed by a charge of 1.5 grams of thioglycolic acid. Heat is then applied until the contents of the flask reach 60° C. Heat is then slowly added such that the temperature of the flask contents increases less than 1 degree per minute until the temperature reaches 70° C. The flask contents then are allowed to remain at this temperature for one hour after which the temperature is increased to 80° C. and held for an additional hour. The reactants in the flask are continually stirred during this reaction. The reactants are then cooled, filtered and air dried overnight.

EXAMPLE II

A copolymer used in accordance with the present invention was prepared as in Example I using the following starting materials:

| | | |
|---|---|---|
| Dichloroethane | ml | 800 |
| Maleic anhydride | g | 101.6 |
| Styrene | g | 108.0 |
| Thioglycolic acid | g | 6.85 |
| Benzoyl peroxide | g | 12.96 |

The reactants were heated to 80° C. and held between 80° and 90° C. for one hour. The copolymer solution was cooled to room temperature and a portion of the dichloroethane solution was placed in a vacuum oven at 175° F. under a 24 inch vacuum. The copolymer was then ground for molecular weight determination using the vapor pressure osmometer technique. In vapor pressure osmometry, two bead thermistors are suspended in a precisely thermostated chamber saturated with solvent vapor. The beads, which undergo a large change in resistant ($\Delta R$) for a relatively small change in temperature, form two legs of a Wheatstone bridge.

When a drop of solvent is placed on the reference thermistor and a drop of solution placed on the measuring thermistor, solvent condenses on the solution drop because of the lower vapor pressure of the solution. This condensation warms the measuring thermistor, producing a difference in temperature and, as a result, a relatively large bridge imbalance $\Delta R$ (approximately 400 ohms per mole for benzene).

Since $\Delta R$ is a relatively quantity dependent on both the solvent and the probe, the VPO must be calibrated with a known molecular weight solute for each solvent and probe used. Its value is determined at several concentrations and plotted. The curve is then extrapolated to infinite dilution to determine the molar constant ($K$). Once established, this constant does not vary for the particular probe and solvent used and only a single calibration is needed. The molecular weight of the unknown is then calculated as follows:

$$M.W. = \frac{K}{\left[\frac{\Delta R}{c}\right]_{c \to 0}}$$

where $c$ = grams/liter.

Using the vapor pressure osmometer procedure, the sample made as above was found to have a molecular weight of 1,495.

The ebulliometric determination of the molecular weight of the styrene maleic anhydride copolymer was accomplished utilizing a Brown boiling point apparatus equipped with a Cottrell pump, Brown condenser, and a Beckmann thermometer. Acetone was employed as the solvent.

The constant $K_B$ (the elevation of the boiling point in ° C. produced by solution of one gram molecular weight of a substance in one kilogram of the solvent) was determined for acetone using n-butyl phthalate and octanol as standards. $K_B$ values calculated from ebulliometric measurements made by successive introductions of standard material into acetone were in agreement with standard $K_B$ values. Ebulliometric measurements were made by successive introductions of the styrene-maleic anhydride copolymer into acetone, and the molecular weight was calculated to be 1500±400.

EXAMPLE III

Sulfonation of the copolymer was made as in Example I was obtained by adding 500 grams dichloroethane to a flask equipped with a stirrer, thermometer, dropping funnel and nitrogen inlet. To the flask contents was slowly added 7.28 grams of triethylphosphate followed by 9.6 grams of sulfur trioxide through the dropping funnel. The flask contents were stirred for one hour. The copolymer was then added to 196 grams of dichloroethane in a similar flask. The sulfur trioxide solution is slowly added to the flask so that the temperature of the charge remains below 25° C. The contents of the flask were stirred for one hour. The styrene sulfonic acid-maleic anhydride copolymer was then filtered, washed twice with ether and allowed to air dry overnight. The sodium salt of the copolymer was prepared by adding about 47 grams of sodium hydroxide to the solution.

EXAMPLE IV

The present example demonstrates the ability of field muds to perform effectively under high temperatures and pressures after treatment with our low molecular weight styrene sulfonic acid-maleic anhydride copolymer (sodium salt). The apparatus utilized in this test was a Model TDL Fann Consistometer, sold by the Fann Instrument Corporation of Houston, Tex. This instrument is designed to test and measure the ability of a test fluid to function under pressures up to 20,000 p.s.i. and temperatures of about 450° F. The instrument is further disclosed in Fann, U.S. Pat. No. 3,073,150. Briefly stated, the consistency or equivalent viscosity of a sample mud in the Fann Consistometer is measured by electrically timing the movement of a small iron bob which is magnetically pulled up and down in a sample container. Sound signals created by the impingement of the bob inside the container are picked up by a microphone and transmitted to a recorder. The time required to pull the bob through a test fluid is a function of its consistency.

To initiate the test, a mud sample was placed in a stainless-steel cylindrical cell which contained a metal bob. Electromagnets located at both ends of the cell chamber were alternately charged, causing the bob to move up and down through the fluid. The bob's travel time was plotted automatically as the temperatures and pressures inside the cell were increased by utilization of an x-time recorder. The consistency of the fluid in the cell was plotted on the horizontal axis and the temperature and pressure recorded on the vertical axis as the test progressed.

In the present example, an aqueous base mud containing a lignosulfonate thinner and utilized in the drilling of an oil well in Vermilion Parish, La., was first tested in the consistometer. Readings were taken at 30 minute intervals during the test period. The initial reading was 160 centipoises. At the end of a two hour test period and after exposing the mud to a temperature of 463° F. and 11,000 p.s.i., the test was terminated because the viscosity of the mud was then 170 centipoises, a reading which unquestionably indicated that, based on this test, the mud was viscous and not utilizable for extended time periods in subterranean drilling operations.

To another sample portion of this base mud was added a 3 p.p.b. treatment of the styrene sulfonic acid-maleic anhydride copolymer in the sodium salt form made as in Example III. This test was conducted for over 6 hours at temperatures over 500° F. and pressures exceeding 16,000 p.s.i. As can be seen in the data below, the viscosity characteristics of the treated test sample were much improved over those of the untreated sample.

The following table further illustrates the results of these tests:

TABLE 4

Base Mud

| Time (hours) | Pressure (p.s.i.) | Temperature (° F.) | Viscosity (centipoises) |
|---|---|---|---|
| 0 | 400 | 76 | 160 |
| ½ | 600 | 185 | 69 |
| 1 | 3,900 | 323 | 42 |
| 1½ | 9,100 | 430 | 48 |
| 2 | 11,000 | 463 | 170 |
| 2½ | | | |

Base Mud plus 3 p.p.b. Copolymer

| 0 | 500 | 78 | 120 |
|---|---|---|---|
| ½ | 1,900 | 190 | 42 |
| 1 | 5,200 | 330 | 24 |
| 1½ | 15,600 | 440 | 27 |
| 2 | 16,600 | 496 | 29 |
| 2½ | 16,200 | 514 | 46 |
| 3 | 16,200 | 509 | 59 |
| 3½ | 16,300 | 507 | 71 |
| 4 | 16,400 | 507 | 87 |
| 4½ | 16,300 | 506 | 100 |
| 5 | 16,200 | 508 | 114 |
| 5½ | 16,200 | 505 | 124 |
| 6 | 16,100 | 510 | 161 |
| 6½ | | | |

EXAMPLE V

Tests were run and results were evaluated as in Example IV with the object being to determine the ability of the treated sample to function after exposure to extreme pressure and temperature and subsequently allowed to remain static for an extended period of time. The base and treated samples were prepared and tested as in Example IV. However, the test on the untreated sample had to be terminated after 7½ hours because the fluid had reached a very unsatisfactory thick stage. After over 8½ hours of testing, the treated fluid showed little sign of adverse temperature and pressure effects. This sample was permitted to remain static for about 15 hours before testing was again initiated. It was noticed that although the material had increased considerably in viscosity it was not so viscous as to not permit the bob to journey through the sample. The results of this test are further indicated in the following table.

TABLE 5

Base Mud

| Time (hours) | Pressure (p.s.i.) | Temperature (° F.) | Viscosity (centipoises) |
|---|---|---|---|
| 0 | 400 | 80 | 51 |
| ½ | 2,100 | 180 | 24 |
| 1 | 7,000 | 320 | 16 |
| 1½ | 9,800 | 403 | 19 |
| 2 | 10,000 | 406 | 22 |
| 2½ | 10,000 | 408 | 27 |
| 3 | 10,000 | 409 | 30 |
| 3½ | 9,200 | 407 | 32 |
| 4 | 9,200 | 408 | 36 |
| 4½ | 9,500 | 408 | 41 |
| 5 | 9,300 | 408 | 48 |
| 5½ | 9,350 | 409 | 53 |
| 6 | 9,350 | 410 | 61 |
| 6½ | 9,350 | 410 | 67 |
| 7 | 9,300 | 412 | 80 |
| 7½ | 9,500 | 412 | 88 |

Base Mud plus 3 p.p.b. Copolymer

| 0 | 400 | 78 | 60 |
|---|---|---|---|
| ½ | 1,700 | 190 | 30 |
| 1 | 8,500 | 332 | 23 |
| 1½ | 9,800 | 406 | 25 |
| 2 | 10,000 | 410 | 25 |
| 2½ | 10,000 | 405 | 18 |
| 3 | 10,000 | 398 | 19 |
| 3½ | 10,000 | 398 | 21 |
| 4 | 10,000 | 403 | 21 |
| 4½ | 10,000 | 400 | 21 |
| 5 | 9,350 | 398 | 21 |
| 5½ | 9,400 | 399 | 22 |
| 6 | 9,450 | 400 | 22 |
| 6½ | 9,450 | 400 | 22 |
| 7 | 10,400 | 400 | 23 |
| 7½ | 10,400 | 402 | 24 |
| 8 | 10,300 | 405 | 27 |
| 8½ | 9,500 | 405 | 29 |

TABLE 5—Continued

Static Overnight

| Time (hours) | Pressure (p.s.i.) | Temperature (° F.) | Viscosity (centipoises) |
|---|---|---|---|
| 23½ | 9,400 | 440 | 65 |
| 24 | 9,500 | 420 | 61 |
| 25 | 9,550 | 410 | 64 |
| 26 | 9,500 | 401 | 62 |
| 27 | 9,400 | 399 | 64 |
| 28 | 9,550 | 402 | 66 |
| 29 | 9,500 | 400 | 67 |
| 30 | 9,500 | 399 | 68 |

EXAMPLE VI

We are aware of U.S. Pat. No. 3,332,872 in which is disclosed the use of low molecular weight styrene-maleic anhydride copolymers as dispersants for aqueous drilling fluids. Our testing clearly indicated that our styrene sulfonic acid-maleic anhydride copolymers was very much superior to the copolymers disclosed in the above-cited patent. In order to properly compare materials, we followed the testing procedure set forth in Example I of U.S. Pat. No. 3,332,872. The colloidal stabilization characteristics of three copolymers were tested under the conditions set forth. The first sample (Sample A) was a commercially available alkali-soluble resinous partial ester of a styrene-maleic anhydride copolymer having a specific viscosity lower than about 0.3. The second tested sample (Sample B) was a 1-to-1 mole ratio of a styrene-maleic anhydride copolymer (sodium salt) having an average molecular weight of less than 20,000. The third sample tested (Sample C) was a 1-to-1 styrene sulfonic acid-maleic anhydride copolymer having a sulfur content of 7.4% by weight, the pre-sulfonated copolymer having a molecular weight of about 2,000. The sodium salt of each sample was utilized for testing purposes. The base mud contained a 35.5% solids and consisted essentially of the following components:

| | Parts by weight |
|---|---|
| Ball clay | 10 |
| Dixie bond clay | 4 |
| Milgel [1] | 1 |

[1] Registered trademark of Milchem Incorporated for a gelling agent.

The mud was thoroughly mixed using a Gifford-Wood homogenizer. The base mud was allowed to age at room temperature for 24 hours after which it was divided into several one barrel equivalents (350 ml. or 448 grams), having a density of 1.281 gm./ml. To the base mud samples were added the following copolymers:

| Sample: | Treatment |
|---|---|
| 1 | — |
| 2 | 2 p.p.b. Sample A |
| 3 | 2 p.p.b. Sample B |
| 4 | 2 p.p.b. Sample C |
| 5 | 4 p.p.b. Sample A |
| 6 | 4 p.p.b. Sample B |
| 7 | 4 p.p.b. Sample C |

After addition of the copolymer treatment, the samples, including the base sample number 1, were stirred for 5 minutes. To each sample was then added 5 grams of hydrated lime. The samples were again stirred for 10 minutes. The samples were then treated with 1 gram of a 4 ml. solution of sodium hydroxide and stirred for 10 minutes. All samples were hot rolled at 150° F. for 16 hours after which the viscosity characteristics were obtained using a Fann Consistometer. A.P.I. filtration rate of each sample was also obtained. The samples were then static aged in sealed and pressurized metallic bombs for 16 hours at 485° F. after which viscosity characteristics and A.P.I. filtration readings were again obtained. The results of this test are given in the tables below:

TABLE 6A
After Hot Rolling

| Sample | Viscosity | | Yield point, lb./100 ft.$^2$ | Gel strength, lb./100 ft.$^2$ | | Filtration, 30 min., A.P.I. | pH |
| | Fann, 600 r.p.m. cp. | Plastic, cp. | | 10 sec. | 10 min. | | |
| --- | --- | --- | --- | --- | --- | --- | --- |
| 1 | Plastic, sample severely gelled | | | | | | |
| 2 | Plastic, sample severely gelled | | | | | | |
| 3 | 94 | 87 | 15 | 42 | 71 | 10.9 | 12.1 |
| 4 | 25 | 25 | 0 | 1 | 2 | 10.8 | 12.2 |
| 5 | Plastic, sample severely gelled | | | | | | |
| 6 | >150 | Too viscous | | 8 | 72 | 7.2 | 12.2 |
| 7 | 32 | 30 | 4 | 1.5 | 3 | 8.4 | 12.1 |

TABLE 6B
After Static Aging (Initial pH)

| Sample[1] | Viscosity | | Yield point, lb./100 ft.$^2$ | Gel strength, lb./100 ft.$^2$ | | Filtration, 30 min., A.P.I. | pH |
| | Fann, 600 r.p.m. cp. | Plastic, cp. | | 10 sec. | 10 min. | | |
| --- | --- | --- | --- | --- | --- | --- | --- |
| 3 | 57 | 45 | 24 | 7 | 68 | | 10.1 |
| 4 | 44 | 38 | 13 | 7 | 58 | | 9.8 |
| 6 | 65 | 49 | 32 | 6 | 84 | | 9.6 |
| 7 | 49 | 39 | 20 | 5 | 62 | | 9.3 |

[1] Other samples not tested because failure after hot rolling was noted.

TABLE 6C
[pH Adjustment]

| Sample[1] | Viscosity | | Yield point, lb./100 ft.$^2$ | Gel strength, lb./100 ft.$^2$ | | Filtration, 30 min., A.P.I. | pH |
| | Fann, 600 r.p.m. cp. | Plastic, cp. | | 10 sec. | 10 min. | | |
| --- | --- | --- | --- | --- | --- | --- | --- |
| 3 | 55 | 47 | 17 | 48 | 107 | 11.8 | 11.6 |
| 4 | 32 | 31 | 2 | 1 | 2 | 14.7 | 11.5 |
| 6 | 89 | 68 | 44 | 14 | 165 | 7.6 | 11.7 |
| 7 | 77 | 62 | 31 | 6 | 90 | 13.2 | 12.0 |

[1] Other samples not tested because failure after hot rolling was noted.

The results of this test clearly indicated that use of the styrene sulfonic acid-maleic anhydride copolymer of the present invention in a lime based drilling fluid provided a dramatic improvement in viscosity characteristics after exposure to high temperatures and pressures and that the present copolymer was a considerable improvement over the prior art styrene-maleic anhydride copolymer.

EXAMPLE VII

The present example demonstrates the ability of the copolymer of the present invention to colloidally stabilize a suspension of 40% illite as a drilling fluid base. To 350 ml. of a 40% illite suspension was added 3, 5 and 8 p.p.b. respectively, of the copolymer of the present invention made as in Examples I and III. The samples were mechanically stirred for 20 minutes. Initial flow properties were then determined by using a Fann Consistometer. The samples were then hot-rolled for 16 hours at 150° F. The samples were then allowed to cool to room temperature after which flow properties were again determined. The samples were then placed in a stainless steel high temperature aging cell pressurized to 500 p.s.i. with nitrogen and exposed to an oven temperature of 465° F. for 16 hours. The samples were again allowed to cool and Fann readings determined. The samples were re-bombed at 490° F. for 16 hours after which flow properties were again determined. The results of this test indicated that our copolymer was extremely effective at both the 5 p.p.b. and 8 p.p.b. treatment levels. The table below further illustrates the results of this test.

TABLE 7

| Sample treatment | Viscosity (degrees Fann), r.p.m. | | | | | | Gels | | pH |
| | 600 | 300 | 200 | 100 | 6 | 3 | 10 sec. | 10 min. | |
| --- | --- | --- | --- | --- | --- | --- | --- | --- | --- |
| 3 p.p.b.: | | | | | | | | | |
| Initial | 23 | 12.5 | 9 | 5.5 | 1 | 1 | 1 | 25 | 9.1 |
| Hot rolled | 29 | 18 | 14 | | 6 | 6 | 8 | 18 | 7.4 |
| 465° F., bomb | 48 | 36 | 32 | 29 | 24 | 24 | 28 | 38 | 6.3 |
| 490° F., bomb | 75 | 59 | 53 | 47 | 37 | 37 | 39 | 56 | 6.3 |
| 5 p.p.b.: | | | | | | | | | |
| Initial | 20 | 10 | 7 | 3.5 | <0.5 | 0 | 0 | 15 | 9.3 |
| Hot rlled | 23 | 13 | 10 | 6.5 | 1 | 2 | 2 | 15 | 7.2 |
| 465° F., bomb | 25 | 14.5 | 10 | 6 | 2 | 2 | 3 | 42 | 6.6 |
| 490° F., bomb | 38 | 25 | 21 | 16 | 12 | 12.5 | 15 | 34 | 6.4 |
| 8 p.p.b.: | | | | | | | | | |
| Initial | 20 | 10 | 7 | 3.5 | 0 | 0 | 1 | 8 | 8.1 |
| Hot rolled | 35 | 20 | 13.5 | 8 | 1.5 | 2 | 2 | 14 | 7.1 |
| 465° F., bomb | 24 | 12 | 8.5 | 5 | 0.5 | 0.5 | 1 | 18 | 7.0 |
| 490° F., bomb | 36 | 21.5 | 16 | 10 | 4 | 5 | 4 | 42 | 6.7 |

EXAMPLE VIII

Tests were run and results were evaluated in order to determine the ability of the copolymer additive of the present invention to colloidally stabilize a 28% calcium bentonite suspension. The copolymer utilized was our 6:9 mole ratio styrene sulfonic acid-maleic anhydride copolymer, sodium salt, having a sulfur content of 7.1% by weight. The initial flow properties were determined before hot rolling the sample at 150° F. for 16 hours. After hot rolling, the flow properties were again determined. The sample was then bombed in pressurized steel cells at 460° F. for 16 hours after which the pH of the sample was adjusted to 7.0 and flow measurements determined. The sample was again bombed at 490° F. for 16 hours, flow properties taken, pH adjusted to simulate alkaline drilling environments and rheological properties determined. The results of this test indicated that our copolymer is an effective stabilizer of bentonite suspensions at increased temperatures. The table below further illustrates the results of this test.

TABLE 8

| Treatment | Viscosity (degrees Fann) r.p.m. | | | | | | Gels | | pH |
| | 600 | 300 | 200 | 100 | 6 | 3 | 10 sec. | 10 min. | |
| --- | --- | --- | --- | --- | --- | --- | --- | --- | --- |
| 3 p.p.b. copolymer: | | | | | | | | | |
| Initial | 40 | 20 | 14.5 | 9 | 4 | 4 | 8 | 22 | 9.2 |
| Hot rolled | 36 | 19 | 14 | 9 | 4 | 4 | 7 | 17 | 8.6 |
| 460° F., bomb | 86 | 68 | 60 | 52 | 36 | 36 | 25 | 47 | 7.0 |
| 490° F., bomb | 47 | 31 | 26 | 30 | 12 | 12 | 4 | 47 | 9.7 |

EXAMPLE IX

Tests were run and results were evaluated in order to determine the ability of the copolymer of the present invention to colloidally stabilize a 28% calcium bentonite suspension contaminated with 4 p.p.b. sodium chloride and 5 p.p.b. gypsum. To this suspension was added 8 p.p.b. of the copolymer as in Example VIII. The testing was conducted as in Example VIII resulting in data which showed that our copolymer effectively stabilized the suspension even at temperatures as high as 480° F. The results of this test are given in the table below:

Each sample was placed in varying p.p.b. levels of calcium bentonite suspensions in order to determine stabilization effects. Initial flow properties were determined, as in previous examples, followed by hot rolling at 150° F. for 16 hours after which flow properties were again measured. Extreme temperature and pressure testing was conducted using sealed and pressurized metallic bombs exposed to 480° F. for 16 hours. The pH was adjusted to simulate alkaline drilling environments. After allowing

TABLE 9

| Treatment | Viscosity (degrees Fann) r.p.m. | | | | | | Gels | | pH |
|---|---|---|---|---|---|---|---|---|---|
| | 600 | 300 | 200 | 100 | 6 | 3 | 10 sec. | 10 min. | |
| 8 p.p.b. ploymer: | | | | | | | | | |
| Initial | 46 | 30 | 24 | 18 | 13 | 13 | 26 | 59 | 9.3 |
| Hot rolled | 46 | 39 | 25 | 19 | 13 | 13 | 22 | 40 | 8.2 |
| Bombed, 480° F | 45 | 29 | 24 | 18 | 12 | 12 | 22 | 46 | 9.2 |

EXAMPLE X

The present example demonstrates the ability of styrene sulfonic acid-maleic anhydride copolymers of varying mole ratios of styrene and maleic anhydride to stabilize calcium bentonite suspensions. The following table provides data on the preparation of the copolymers.

the bombs to cool, flow properties were again measured. The following table further illustrates the results of these tests.

TABLE 10 A

| Sample Number | 1 | 2 | 3 | 4 | 5 | 6 |
|---|---|---|---|---|---|---|
| Mole ratio (styrene-to-maleic) | 1.5-1 | 2.0-1 | 2.5-1 | 5.0-1 | 10.0-1 | 20.0-1 |
| Styrene, g | 26.9 | 35.9 | 44.8 | 45.0 | 45.0 | 45.0 |
| Maleic anhydride, g | 16.9 | 16.9 | 16.9 | 8.2 | 4.1 | 2.05 |
| Thioglycolic acid, g | 1.08 | 1.08 | 1.08 | 1.08 | 1.08 | 1.08 |
| Benzoyl peroxide, g | 2.16 | 2.16 | 2.16 | 2.16 | 2.16 | 2.16 |
| Dichlorethane, ml | 700 | 700 | 700 | 700 | 700 | 700 |
| Water, ml | 200 | 200 | 200 | 200 | 200 | 200 |
| $SO_3$, g | 20.6 | 27.6 | 34.5 | 34.5 | 34.5 | 34.5 |
| NaOH, (50%), g | 56.0 | 62.0 | 78.0 | 56.0 | 54.7 | 47.4 |
| pH, product | 9.9 | 9.8 | 11.7 | 10.5 | 9.3 | 10.5 |

TABLE 10B

| Sample | Viscosity (degrees Fann), r.p.m. | | | | | | Gels | | pH |
|---|---|---|---|---|---|---|---|---|---|
| | 600 | 300 | 200 | 100 | 6 | 3 | 10 sec. | 10 min. | |
| No copolymer: | | | | | | | | | |
| Initial | 98 | 83 | 74 | 69 | 58 | 58 | 53 | 59 | 9.1 |
| Hot rolled | 74 | 60 | 55 | 48 | 39 | 59 | 40 | 41 | 8.0 |
| Bombed | 27 | 17 | 14 | 10.5 | 8 | 7.5 | 7 | 130 | 9.4 |
| Sample No. 1 (1 p.p.b.): | | | | | | | | | |
| Initial | 47 | 33 | 28 | 23 | 18 | 18 | 26 | 38 | 9.6 |
| Hot rolled | 43 | 30 | 26 | 20 | 14 | 15 | 20 | 43 | 8.3 |
| Bombed | 34 | 17.5 | 11.5 | 6.5 | 2 | 2 | 1 | 52 | 9.3 |
| D.O., 3 p.p.b.: | | | | | | | | | |
| Initial | 39 | 22 | 17 | 11 | 6 | 6 | 11 | 37 | 9.5 |
| Hot rolled | 40 | 23 | 18 | 13 | 7 | 7 | 11 | 26 | 8.2 |
| Bombed | 43 | 24 | 19 | 12 | 7 | 7 | 8 | 55 | 9.2 |
| D.O., 5 p.p.b.: | | | | | | | | | |
| Initial | 55 | 28 | 19 | 11 | 3 | 4 | 9 | 39 | 9.6 |
| Hot rolled | 50 | 27 | 19 | 12 | 5 | 5 | 10 | 26 | 8.2 |
| Bombed | 63 | 33 | 24 | 13 | 7 | 7 | 9 | 65 | 9.3 |
| D.O., 7 p.p.b.: | | | | | | | | | |
| Initial | 87 | 46 | 32 | 18.5 | 8 | 8 | 15 | 65 | 9.5 |
| Hot rolled | 85 | 46 | 34 | 20 | 8 | 8 | 17 | 43 | 8.2 |
| Bombed | 110 | 63 | 45 | 24 | 6 | 6 | 7 | 69 | 9.0 |
| Sample No. 2 (1 p.p.b.): | | | | | | | | | |
| Initial | 60 | 44 | 38 | 33 | 26 | 26 | 30 | 42 | 9.7 |
| Hot rolled | 49 | 36 | 32 | 26 | 20 | 21 | 26 | 39 | 8.0 |
| Bombed | 30 | 15 | 10 | 5 | 0.5 | 0 | ~1 | 52 | 9.9 |
| D.O., 3 p.p.b.: | | | | | | | | | |
| Initial | 53 | 21 | 23 | 16.5 | 11 | 11 | 22 | 56 | 9.5 |
| Hot rolled | 43 | 27 | 21 | 15 | 10 | 10 | 12 | 30 | 8.0 |
| Bombed | 38 | 20 | 15 | 9 | 5 | 5 | 9 | 56 | 9.6 |
| D.O., 5 p.p.b.: | | | | | | | | | |
| Initial | 61 | 32 | 23 | 14 | 7 | 7 | 14 | 56 | 9.6 |
| Hot rolled | 49 | 28 | 19 | 23 | 7 | 7 | 10 | 27 | 8.0 |
| Bombed | 39 | 23 | 17 | 12 | 8 | 7 | 18 | 68 | 9.3 |
| D.O., 7 p.p.b.: | | | | | | | | | |
| Initial | 112 | 62 | 43 | 25 | 13 | 13 | 27 | 83 | 9.4 |
| Hot rolled | 75 | 40 | 39 | 17 | 9 | 9 | 14 | 37 | 7.9 |
| Bombed | 65 | 36 | 25 | 16 | 10 | 10 | 26 | 54 | 9.4 |

TABLE 10B—Continued

| Sample | Viscosity (degrees Fann), r.p.m. | | | | | | Gels | | pH |
|---|---|---|---|---|---|---|---|---|---|
| | 600 | 300 | 200 | 100 | 6 | 3 | 10 sec. | 10 min. | |
| Sample No. 3 (1 p.p.b.): | | | | | | | | | |
| Initial | 71 | 57 | 52 | 46 | 40 | 40 | 42 | 44 | 9.5 |
| Hot rolled | 55 | 42 | 37 | 31 | 25 | 26 | 31 | 37 | 8.2 |
| Bombed | 26 | 14 | 11 | 7 | 1 | <0.5 | 1 | 22 | 8.9 |
| D.O., 3 p.p.b.: | | | | | | | | | |
| Initial | 52 | 34 | 26 | 20 | 15 | 16 | 27 | 69 | 9.4 |
| Hot rolled | 55 | 35 | 28 | 22 | 15 | 16 | 22 | 44 | 8.2 |
| Bombed | 30 | 24 | 18.5 | 13 | 7 | 8 | 4 | 64 | 9.4 |
| D.O., 5 p.p.b.: | | | | | | | | | |
| Initial | 61 | 34 | 25 | 18 | 11 | 11 | 22 | 73 | 9.5 |
| Hot rolled | 59 | 35 | 26 | 19 | 12 | 12 | 17 | 44 | 8.3 |
| Bombed | 52 | 32 | 25 | 17 | 10 | 9 | 5 | 34 | 8.1 |
| Sample No. 4 (1 p.p.b.): | | | | | | | | | |
| Initia | 127 | 110 | 100 | 94 | 80 | 79 | 68 | 68 | 9.4 |
| Hot rolled | 80 | 67 | 60 | 54 | 44 | 45 | 43 | 42 | 8.2 |
| Bombed | 20 | 12 | 9 | 6 | 0.5 | <0.5 | <1 | 25 | 8.9 |
| D.O., 3 p.p.b.: | | | | | | | | | |
| Initial | 143 | 115 | 104 | 94 | 77 | 76 | 65 | 80 | 9.3 |
| Hot rolled | 81 | 64 | 58 | 51 | 40 | 40 | 41 | 40 | 8.2 |
| Bombed | 34 | 23 | 19 | 16 | 12 | 12 | 99 | 100 | 9.0 |
| D.O., 5 p.p.b.: | | | | | | | | | |
| Initial | 118 | 86 | 78 | 71 | 58 | 58 | 52 | 64 | 9.1 |
| Hot rolled | 77 | 61 | 55 | 48 | 37 | 37 | 39 | 43 | 8.1 |
| Bombed | 44 | 29 | 25 | 19 | 11 | 10 | 21 | 110 | 8.7 |
| Sample No. 5 (1 p.p.b.): | | | | | | | | | |
| Initial | 139 | 126 | 115 | 108 | 98 | 78 | 67 | 70 | 9.3 |
| Hot rolled | 80 | 68 | 62 | 51 | 46 | 47 | 44 | 45 | 8.2 |
| Bombed | 25 | 14 | 10 | 6 | 2 | 1 | 43 | 18 | 8.5 |
| D.O., 3 p.p.b.: | | | | | | | | | |
| Initial | 207 | 182 | 164 | 152 | 132 | 106 | 87 | 94 | 9.5 |
| Hot rolled | 103 | 86 | 79 | 71 | 57 | 57 | 52 | 53 | 8.2 |
| Bombed | 49 | 33 | 27 | 22 | 18 | 18 | 33 | 86 | 9.2 |
| D.O., 5 p.p.b.: | | | | | | | | | |
| Initial | 151 | 132 | 119 | 109 | 92 | 92 | 80 | 84 | 9.3 |
| Hot rolled | 99 | 81 | 74 | 66 | 51 | 51 | 49 | 48 | 8.1 |
| Bombed | 50 | 37 | 32 | 27 | 23 | 24 | 36 | 120 | 9.0 |
| Sample No. 6 (1 p.p.b.): | | | | | | | | | |
| Initial | 172 | 149 | 134 | 126 | 106 | 86 | 68 | 69 | 9.5 |
| Hot rolled | 79 | 66 | 60 | 53 | 43 | 43 | 41 | 43 | 8.2 |
| Bombed | 25 | 14 | 10 | 7 | 1.5 | 1 | 1 | 72 | 9.3 |
| D.O., 3 p.p.b.: | | | | | | | | | |
| Initial | 150 | 132 | 122 | 113 | 92 | 81 | 68 | 72 | 9.2 |
| Hot rolled | 95 | 80 | 73 | 65 | 50 | 50 | 48 | 48 | 8.1 |
| Bombed | 29 | 18 | 14 | 10 | 7 | 6 | 15 | 50 | 8.7 |
| D.O., 5 p.p.b.: | | | | | | | | | |
| Initial | 143 | 125 | 116 | 106 | 86 | 84 | 74 | 85 | 9.2 |
| Hot rolled | 102 | 83 | 76 | 68 | 53 | 53 | 52 | 51 | 8.3 |
| Bombed | 55 | 40 | 36 | 31 | 28 | 29 | 37 | 82 | 9.0 |

EXAMPLE XI

The present example demonstrates the ability of the copolymer of the present invention to stabilize a field mud used in the drilling of a well. For this test a 2-to-1 mole ratio styrene sulfonic acid-maleic anhydride copolymer was utilized at treatment levels of 1 p.p.b. and 2.5 p.p.b. The mud had the following initial properties:

Apparent viscosity _____ 10.5 cps.
Plastic viscosity _____ 8 cps.
Yield point _____ 2 lb./ft./100 ft.$^2$.
pH _____ 10.2.

Because the mud was extremely thin, 4 p.p.b. of sodium chloride was added to cause intentional flocculation. After this addition, the mud had the following properties:

Apparent viscosity _____ 29.5 cps.
Plastic viscosity _____ 10 cps.
Yield point _____ 39 lb./ft./100 ft.$^2$.
pH _____ 9.9.

The testing was conducted as in the previous examples. The results indicated that the copolymer of the present invention effectively stabilized the suspensions. The results of this test are given in the following table.

TABLE 11

| | Viscosity (degrees Fann), r. p. m. | | | | | | Gels | | pH |
|---|---|---|---|---|---|---|---|---|---|
| | 600 | 300 | 200 | 100 | 6 | 3 | 10 sec. | 10 min. | |
| Field mud: | | | | | | | | | |
| Initial | 59 | 49 | 45 | 40 | 33 | 33 | 32 | 41 | 9.9 |
| Hot rolled | 58 | 45 | 40 | 34 | 23 | 23 | 22 | 41 | 9.8 |
| Bombed | >300 | >300 | 298 | 293 | 180 | 134 | Too viscous to measure | | 6.7 |
| F.M.[1] plus 1 p.p.b. copolymer: | | | | | | | | | |
| Initial | 51 | 38 | 34 | 26 | 19 | 19 | 20 | 55 | 9.8 |
| Hot rolled | 35 | 22 | 17 | 11 | 2 | 2 | 4 | 26 | 9.8 |
| Bombed | 156 | 145 | 134 | 130 | 111 | 76 | 60 | 64 | 6.9 |
| F.M.[1] plus 2.5 p.p.b. copolymer: | | | | | | | | | |
| Initial | 60 | 50 | 45 | 40 | 30 | 31 | 32 | 48 | 9.9 |
| Hot rolled | 35 | 23 | 18 | 12 | 4 | 4 | 3 | 29 | 9.8 |
| Bombed | 110 | 99 | 96 | 94 | 79 | 75 | 65 | 68 | 6.8 |

[1] F.M.=Field Mud.

Although the invention has been described in terms of specified embodiments which are set forth in detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What we claim is:

1. An aqueous drilling fluid consisting essentially of an aqueous base, a clayey material suspended in said aqueous base, and from about 0.5 p.p.b. to about 25 p.p.b. of a styrene sulfonic acid-maleic anhydride copolymer in a mole ratio of styrene-to-maleic anhydride from about 1-to-1 to about 100-to-1, the molecular weight of said copolymer before sulfonation being between about 1,000 and about 5,000.

2. An aqueous drilling fluid consisting essentially of an aqueous base, a clayey material suspended in said aqueous base, and from about 0.5 p.p.b. to about 25 p.p.b. of a water soluble salt of a styrene sulfonic acid-maleic anhydride copolymer in a mole ratio of styrene-to-maleic anhydride from about 1-to-1 to about 100-to-1, the molecular weight of said copolymer before sulfonation being between about 1,000 and about 5,000.

3. In the process of drilling a subterranean well wherein there is circulated in the borehole of said well an aqueous drilling fluid containing clayey material suspended therein, the steps of adding to said drilling fluid from about 0.5 p.p.b. to about 25 p.p.b. of a styrene sulfonic acid-maleic anhydride copolymer in a mole ratio of styrene-to-maleic anhydride from about 1-to-1 to about 100-to-1, the molecular weight of said copolymer before sulfonation being between about 1,000 and about 5,000, and circulating said drilling fluid throughout said well.

4. In the process of drilling a subterranean well wherein there is circulated in the borehole of said well an aqueous drilling fluid containing clayey material suspended therein, the steps of adding to said drilling fluid from about 0.5 p.p.b. to about 25 p.p.b. of a water soluble salt of a styrene sulfonic acid-maleic anhydride copolymer in a mole ratio of styrene-to-maleic anhydride from about 1-to-1 to about 100-to-1, the molecular weight of said copolymer before sulfonation being between about 1,000 and about 5,000, and circulating said drilling fluid throughout said well.

References Cited

UNITED STATES PATENTS

| | | | |
|---|---|---|---|
| 2,612,485 | 9/1952 | Baer et al. | 252—8.5 X |
| 2,650,905 | 9/1953 | Fordyce et al. | 252—8.5 |
| 2,718,497 | 9/1955 | Oldham et al. | 252—8.5 |
| 2,857,365 | 10/1958 | Johnson | 260—78.5 |
| 3,332,872 | 7/1967 | Oakes | 252—8.5 |

HERBERT B. GUYNN, Primary Examiner

U.S. Cl. X.R.

260—78.5 BB